Aug. 25, 1964   R. T. BURNETT   3,145,809
AUTOMATIC ADJUSTER
Original Filed Dec. 20, 1954   2 Sheets-Sheet 1
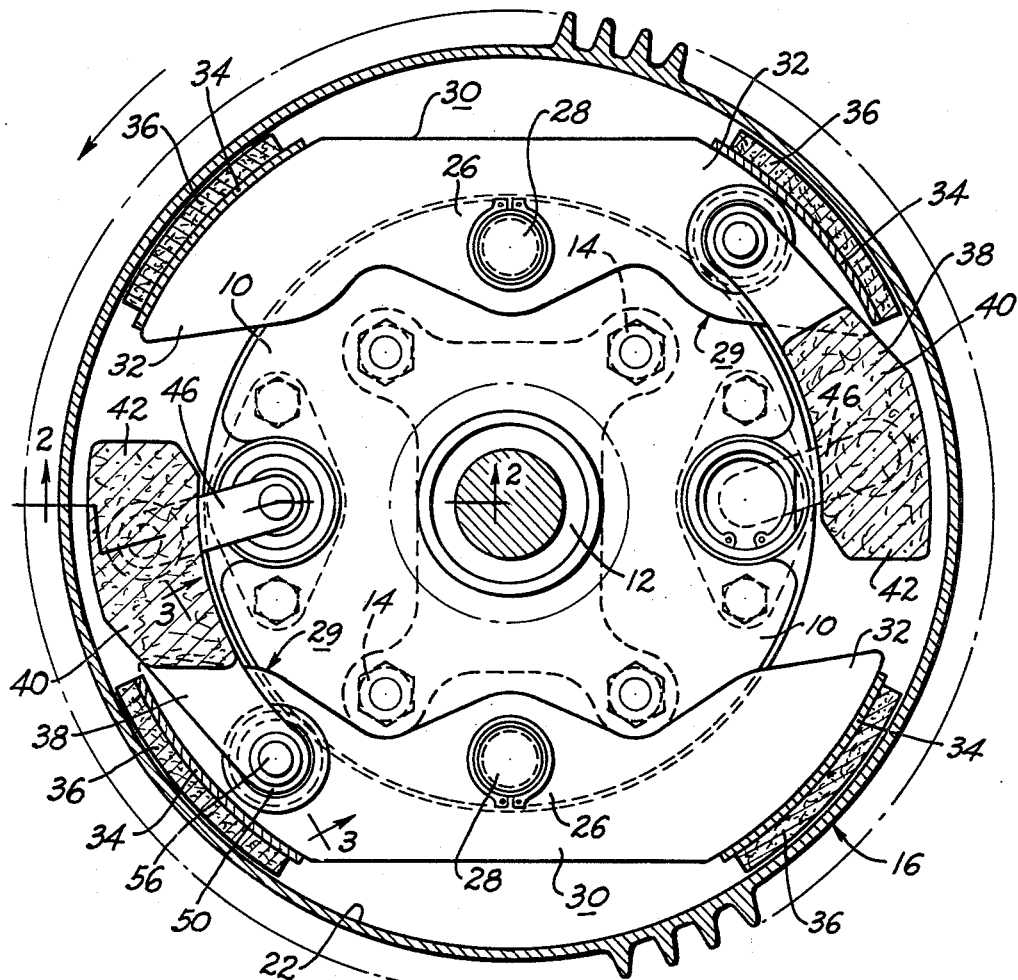
FIG_1
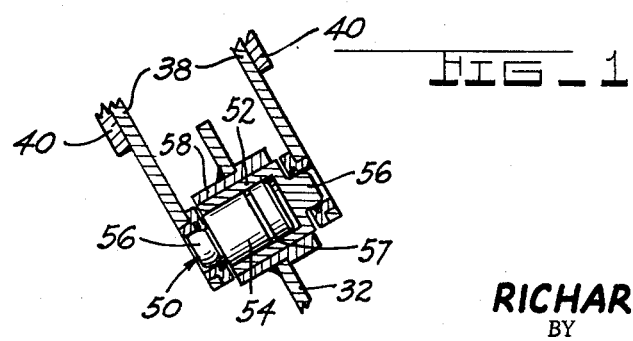
FIG_3
INVENTOR.
RICHARD T. BURNETT.
BY
*Gordon H. Chen*
AGENT.

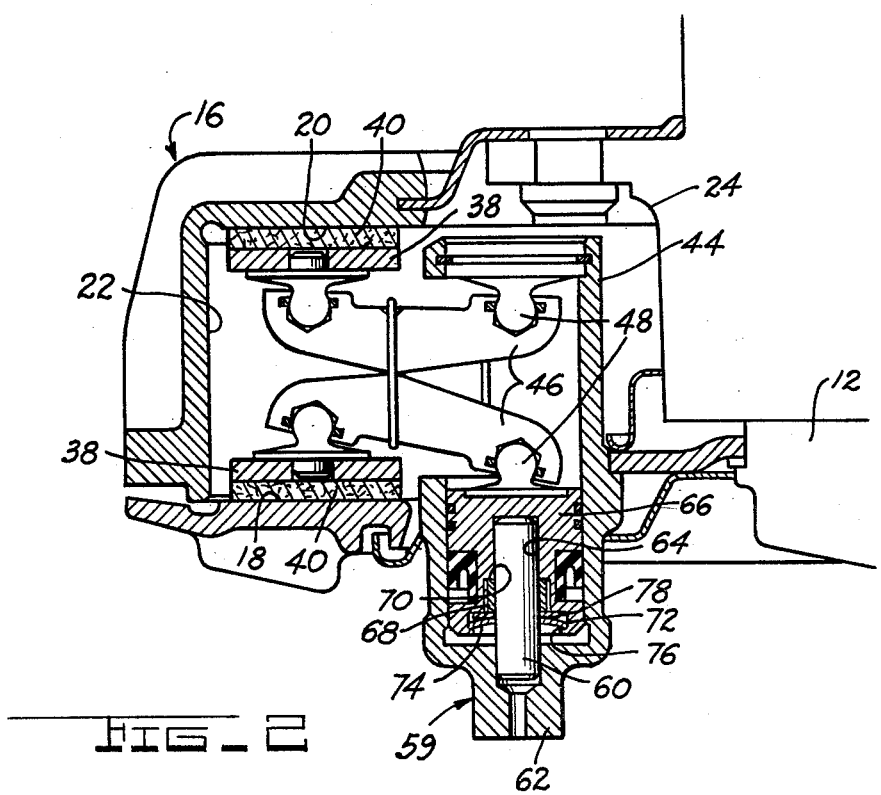

3,145,809
AUTOMATIC ADJUSTER
Richard T. Burnett, South Bend, Ind., assignor to The Bendix Corporation, a corporation of Delaware
Continuation of application Ser. No. 800,342, Mar. 18, 1959, which is a division of application Ser. No. 476,170, Dec. 20, 1954, now Patent No. 2,888,105, dated May 26, 1959. This application Sept. 18, 1961, Ser. No. 138,652
7 Claims. (Cl. 188—196)

This invention relates to a brake and more specifically to a composite brake, having distinct friction elements which are both axially and radially applied. The present application is a continuation of U.S. application Serial No. 800,342 filed March 18, 1959, now forfeited, which in turn is a division of application Serial No. 476,170 filed December 20, 1954, now Patent No. 2,888,105.

Reference should be made to my copending application No. 433,609 filed June 1, 1954, now Patent No. 2,927,664 for further explanation of structure herein disclosed. The present invention illustrates additional means of utilizing "disk" braking reaction as the actuating force for radially movable friction elements.

An important feature of the present invention relates to brake controllability. This characteristic has to do with the relationship between retarding force on the vehicle and the applying effort of the operator. Brake controllability is highly important in a vehicle brake, and to achieve optimum controllability it is necessary to obtain consistency is performance of the brake during the course of a stop.

Another desirable quality of automotive brakes is related to pedal travel. It is considered very objectionable to have a varying pedal stroke which increases as lining wear progresses. The response time in applying the brake is very greatly increased, and the pedal characteristics are not fixed to give the operator consistent brake performance with equivalent applying effort. From these prefatory statements it will become apparent that the following objects of the invention are highly significant.

The foremost object of the invention is to obtain brake controllability in which the retarding effort of the brake on the vehicle is substantially proportional to the operator's applying effort throughout the course of a stop and throughout the wear life of the brake.

Another object of the invention is to provide braking effectiveness which is not appreciably affected by the direction of movement of the vehicle which is to be impeded.

A further object of the invention is to obtain automatic adjustment of the friction elements according to the degree of wear thereof, so that the pedal travel characteristics of the brake remain substantially uninfluenced by lining wear.

A further object of the invention is to translate pivoting movement of one friction element to radial application of another through a linkage which is characterized by simplicity in construction and economy in cost.

Other objects and features of the invention will appear more fully from a consideration of the following description, taken in connection with the drawings, wherein a plurality of embodiments of the invention are illustrated by way of example.

In the drawings:

FIGURE 1 is a side elevation of a brake assembly illustrating one embodiment of the invention; and FIGURES 2 and 3 are section views taken on the lines 2—2 and 3—3 of FIGURE 1.

Referring to the embodiment shown in FIGURES 1 and 2, a support plate 10 is secured to a fixed part of the vehicle, as for example spindle 12, by means of fastening devices 14. A rotor 16 having oppositely facing disk surfaces 18 and 20 joined by a cylindrical drum surface 22 is secured to a rotatable part of the vehicle, as for example hub 24.

The support plate 10 has radially extending portions 26 (FIGURE 1) which are laterally offset from the center portion thereof. The offset portions 26 have anchors 28 suitably secured thereto.

Each of the arcuate shoe friction elements is composed of a web 32 having a transverse rim 34 formed along a segment of the periphery of the web at opposite sides of the associated anchor 28. The rims 34 are provided with friction material lining 36 engageable with surface 22 of the rotor 16.

To apply the arcuate shoe friction elements 30, I provide two disk elements 38 for each of the brake units. These disk elements have friction material lining 40 which is engageable with the surfaces 18 and 20 of the rotor (FIGURE 2). The disk friction elements 38 are sometimes referred to as "flat shoes," to differentiate them from the arcuate shoe friction elements which are radially applied. The term "flat shoes" is used interchangeably with "disk friction elements" since the two are equivalent. At one end 42 of each of the "flat shoes" 38 there is provided an actuating mechanism comprising a fluid motor 44 and articulated levers 46 connected with the "flat shoes" through ball socket joints 48. The "flat shoes" are connected to the friction elements 30 through a rotatable connection 50 (FIGURES 1 and 3). This connection 50 consists of cylinders 52 and 54 which are slidably interfitted and fastened at opposite ends to the flat shoes 38 through a snap-ring and recess arrangement 56. Cylinder 52 is slidably received in a bushing 58 which is fixedly secured to the web 32 of the pivoted friction element at one end thereof. A ring 57 is mounted on the periphery of cylinder 54 to resist sliding of cylinder 54 within cylinder 52.

An automatic adjusting device 59 (FIGURE 2) is provided in each fluid motor 44 to compensate for wear of the lining 40 on "flat shoes" 38. The automatic adjusting device is constructed about a fixed post 60 which is fastened at one end thereof to cylinder 62. The post 60 extends into a recess 64 provided in piston 66 which is reciprocably received in the cylinder 62. A sleeve 68 frictionally grips the surface of the post 60. A shoulder 70, which is formed in piston 66, contacts sleeve 68 and thus the sleeve 68 serves to limit retraction of the piston 66. A curved washer 72 is received in a recess 74 formed in the piston 66. The curved washer 72 is compressed between shoulder 76 and annular member 78 which bears against sleeve 68.

Assume in operation, that the brake is applied with the rotor turning counterclockwise as shown in FIGURE 1. Fluid pressure from a master cylinder source (not shown) is transmitted to cylinder 62 where is causes movement of the piston 66 (FIGURE 2) in an upwardly direction. Piston movement causes rocking of articulated levers 46 which in turn act to spread the "flat shoes" 38. The "flat shoes" 38 are forced apart thus engaging friction material lining 40 with the surfaces 18 and 20 of the rotor. It will be noted that the ends 50 of the "flat shoes" are forced apart during "flat shoe" application, this being permitted by the slidable interfitting of cylinders 52 and 54. The two flat shoes may move together in either direction since cylinder 52 is slidable in bushing 58. The flat shoes 38 are thus completely engaged along their entire length with the disk surface 18 and 20.

Assuming counterclockwise rotor movement in the direction indicated (FIGURE 1), engagement of the flat shoes with the disk surfaces causes them to move circumferentially with the rotor, thus producing swivelling of the levers 46 on the ball socket connections with the wheel cylinders and flat shoes. Torque reaction from engagement of the flat shoes is transmitted to the shoe friction element 30 through ends 50 of the flat shoes to the bushing 58 and the web 32.

Further explanation of operation is with reference to the brake unit at the lower left hand side of FIGURE 1. The torque transmitted from the "flat shoes" to the shoe friction element 30 causes counterclockwise turning of the shoe friction element 30 on anchor 28, thus forcibly engaging the friction material lining 36 on the left hand side of the element with surface 22 of the rotor 16.

During braking with opposite rotor movement, engagement of the "flat shoes" with surfaces 18 and 20 of the rotor, causes circumferential movement of the "flat shoes" with the rotor, in a clockwise direction. This movement of the "flat shoes" imposes clockwise movement of the shoe friction element 30 about anchor 28 thus forcibly engaging friction material lining 36 on the right hand side of the shoe element 30 with surface 22 of the rotor.

It will thus be seen that during braking in either direction, there is obtained both "flat shoes" braking and arcuate shoe braking, with the torque reaction of the former serving as applying effort for the latter.

With brake usage, the lining 40 on the "flat shoes" is worn. This lining wear is compensated for by operation of the automatic adjustor which will next be described.

As the piston 66 in FIGURE 2 is moved upwardly, the curved washer 72 is flattened, and the shoulder 70 on the piston 66 moves away from contact with the sleeve 68 while the curved washer 72 is being loaded. After the washer 72 is substantially flattened, any further piston movement exerts an upwardly directed force on the sleeve 68 through the washer 72 and annular member 78. This force is sufficient to overcome the friction force between the sleeve 68 and the post 60. The sleeve 68 is thus forced upwardly on the post 60 and this upward movement continues until piston movement stops, indicating that the lining 40 is completely applied against the sides of the rotor.

When the brake pressure is relieved, the now flattened washer 72 exerts a downwardly directed force on the piston 66 through the shoulder 76 as it tends to resume its original curved shape. The resilience of the washer 72 forces the piston 66 in a downwardly direction until the shoulder 70 engages friction sleeve 68 which has been advanced to a new position in the manner before described. It will be noted that the effect of operation of the adjuster is to limit retraction of the piston 66, to a predetermined distance, represented by movement of the piston necessary to flatten the washer 72.

The extent of retraction of the piston 66 determines clearance of the lining 40 on the "flat shoes" from surfaces 18 and 20. This clearance will not be exceeded because of lining wear, since the piston moves upwardly in increments defined by successively higher positions of the sleeve on the post 60.

Although only a single embodiment of the invention has been described, numerous modifications of the invention will occur to those skilled in the art. I intend, therefore, to include within the scope of the following claims all equivalent devices which are similar in structure and function in substantially the same manner as that described.

I claim:

1. An automatic adjuster for axially applied friction elements comprising a cylinder, a piston reciprocably mounted in said cylinder and having a center opening therein, a pin secured to said cylinder and projecting outwardly with an end thereof extending within the center opening of said piston, a sleeve frictionally gripping said pin and carried thereby, a resilient component deflected by movement of said piston and having an outer periphery received within a recess of said piston to be moved thereby, said sleeve being located between said resilient component and the projecting end of said pin, means forming a thrust transmitting connection between said resilient component and sleeve to effect displacement of the sleeve along the length of said pin to successive positions thereon, and an abutment between said sleeve and piston serving to limit retraction of said piston by said resilient component according to the respective adjusted positions of said piston defined by the location of said sleeve on said pin.

2. An automatic adjuster in combination with a fluid pressure responsive device having a movable piston, said adjuster comprising a curved washer having its outer periphery bearing against said piston, a fixed stem secured at one end to said device and projecting therefrom, a sleeve gripping said stem and frictionally resisting relative movement therebetween, means forming a connection between said curved washer and sleeve to retain said curved washer relatively to said stem as piston movement produces deflection of said washer, said piston being effective to translate said sleeve along said stem and acting through said curved washer to overcome the frictional resistance of said sleeve when said washer is deflected beyond a predetermined amount, means forming a retraction abutment between said sleeve and piston to define the adjusted position of said piston along the length of said pin, said sleeve being positioned between said washer and the projecting end of said stem, the resilience of said curved washer being sufficient to produce retraction of said piston which is limited in the extent of its retraction by abutment with said sleeve.

3. In a brake, or the like, a cylinder housing having a bore therein, a piston slidable in said bore and having a recess opening into the rear face thereof, an element having a central opening therein, an elongated member operatively connected to said housing and extending through said central opening and into said piston recess, said piston and elongated member being relatively slidable in an axial direction of said bore, said element frictionally gripping said elongated member and defining the retracted position of said piston relative to said elongated member and bore, a lost motion thrust connection between said piston and said element for overcoming the friction grip of said element on said elongated member to move said element forwardly to a new gripping position when said piston has been actuated in a forward direction further than the distance permitted by said lost motion thrust connection, resilient means supported on said piston and reacting on said element for biasing said piston rearwardly to retract said piston after actuation thereof.

4. In a brake, or the like, a cylinder housing having a bore therein, a piston slidable in said bore and having a recess opening into the rear face thereof, an element having a central opening therein, abutment means having a central opening therein, an elongated member operatively connected to said housing and extending through said central openings and into said piston recess, said piston and elongated member being relatively slidable in an axial direction of said bore, said element frictionally gripping said elongated member and defining the retracted position of said piston relative to said elongated member and bore, said piston having a lost motion thrust connection with said abutment means and said element to overcome the friction grip of said element on said elongated member to move said element forwardly to a new gripping position when said piston has moved in a forward direction further than the distance permitted by the lost motion thrust connection, resilient means supported on said piston and engaging said abutment means, said resilient means being so arranged to bias said abutment means into engagement with said element, said element providing a reaction support for developing a retracting force by said resilient means to retract said piston after actuation thereof.

5. The structure as recited in claim 4 wherein said resilient means comprises a curved resilient washer, the outer periphery of said washer being operatively connected to said piston and the inner portion thereof engaging said abutment means.

6. The structure as recited in claim 5 wherein said abutment means comprises a flat washer having one surface arranged for engaging said element and the other surface arranged for engaging said curved resilient washer.

7. In a brake or the like, a cylinder housing having a bore therein, a piston slidable in said bore and having a recess opening into the rear face thereof, an element having a central opening therein, abutment means having a central opening therein, an elongated member operatively connected to said housing and extending through said central openings and into said piston recess, said piston and elongated member being relatively slidable in an axial direction of said bore, said element frictionally gripping said elongated member and defining the retracted position of said piston relative to said elongated member and bore, said abutment means engaging the rear of said element, said piston having a lost motion thrust connection with said abutment means and said element to overcome the friction grip of said element on said elongated member to move said element forwardly to a new gripping position when said piston has moved in a forward direction further than the distance permitted by the lost motion thrust connection, shoulder means extending from the wall of said piston recess toward said elongated member and located on said piston to the rear of said element and abutment means, resilient means supported by said shoulder means and engaging said abutment means, said resilient means being so arranged to bias said abutment means forwardly into engagement with said element, said element providing a reaction support for developing a retracting force by said resilient means to retract said piston after actuation thereof.

References Cited in the file of this patent

UNITED STATES PATENTS

| | | |
|---|---|---|
| 2,531,341 | Meador | Nov. 21, 1950 |
| 2,736,396 | Rasmussen et al. | Feb. 28, 1956 |

FOREIGN PATENTS

| | | |
|---|---|---|
| 711,405 | Great Britain | June 30, 1954 |
| 717,350 | Great Britain | Oct. 27, 1954 |
| 461,409 | Italy | Jan. 26, 1951 |
| 461,453 | Italy | Jan. 29, 1951 |